United States Patent
Jeon

(10) Patent No.: US 12,373,787 B2
(45) Date of Patent: Jul. 29, 2025

(54) SERVER AND SYSTEM FOR PERFORMING MULTI-ORDER PICKING TO ALLOCATE GROUPED ORDERS TO EACH LOADING BOX INCLUDED IN ONE ROBOT

(71) Applicant: Twinny Co., Ltd., Daejeon (KR)

(72) Inventor: Seol Hee Jeon, Daejeon (KR)

(73) Assignee: TWINNY CO., LTD. (KR)

( * ) Notice: Subject to any disclaimer, the term of this patent is extended or adjusted under 35 U.S.C. 154(b) by 0 days.

(21) Appl. No.: 18/905,273

(22) Filed: Oct. 3, 2024

(65) Prior Publication Data
US 2025/0209419 A1    Jun. 26, 2025

(30) Foreign Application Priority Data
Dec. 22, 2023    (KR) ........................ 10-2023-0189945

(51) Int. Cl.
| | | |
|---|---|---|
| *G06F 7/00* | (2006.01) | |
| *B65G 1/137* | (2006.01) | |
| *G06Q 10/083* | (2023.01) | |
| *G06Q 10/087* | (2023.01) | |

(52) U.S. Cl.
CPC ......... *G06Q 10/087* (2013.01); *B65G 1/1375* (2013.01); *G06Q 10/083* (2013.01); *B65G 2209/02* (2013.01); *B65G 2209/06* (2013.01)

(58) Field of Classification Search
CPC .... G06Q 10/087; G06Q 10/083; G06Q 10/08; B65G 1/1375; B65G 2209/02; B65G 2209/06; B65G 1/00
USPC ......................................... 700/213–216, 223
See application file for complete search history.

(56) References Cited

U.S. PATENT DOCUMENTS

| | | | |
|---|---|---|---|
| 8,306,738 B2 | 11/2012 | Kong | |
| 2020/0239233 A1* | 7/2020 | Johnson | ................. G06Q 10/00 |
| 2023/0399177 A1* | 12/2023 | Lee | ................. G06Q 10/06316 |

FOREIGN PATENT DOCUMENTS

| | | | | |
|---|---|---|---|---|
| CN | 110197309 B | * | 11/2021 | ............. G06Q 10/04 |
| JP | 5410795 | | 2/2014 | |
| KR | 20180059188 A | | 6/2018 | |
| KR | 20190077481 A | | 7/2019 | |
| KR | 20190122209 A | | 10/2019 | |
| KR | 20210127949 A | | 10/2021 | |
| KR | 20220000331 A | | 1/2022 | |
| KR | 20220064913 A | | 5/2022 | |
| KR | 20230038568 A | | 3/2023 | |
| KR | 102559162 B1 | | 7/2023 | |

(Continued)

OTHER PUBLICATIONS

International Search Report issued in App. No. PCT/KR2024/014483, dated Dec. 20, 2024, 4 pages.

*Primary Examiner* — Yolanda R Cumbess
(74) *Attorney, Agent, or Firm* — Blueshift IP; Robert Plotkin

(57) ABSTRACT

Provided is a method of operating a server. The method includes generating a sequence for a plurality of orders based on shipments included in each of the plurality of orders, acquiring a plurality of groups including one or more consecutive orders among the plurality of sorted orders according to the generated sequence, allocating the plurality of groups to a plurality of robots such that the groups and robots are matched one-to-one, and allocating tasks to the plurality of robots based on orders included in each group.

10 Claims, 13 Drawing Sheets

(56) References Cited

FOREIGN PATENT DOCUMENTS

| KR | 20230169614 | A  | 12/2023 |
|----|-------------|----|---------|
| KR | 102688609   | B1 | 7/2024  |

\* cited by examiner

SERVER AND SYSTEM FOR PERFORMING MULTI-ORDER PICKING TO ALLOCATE GROUPED ORDERS TO EACH LOADING BOX INCLUDED IN ONE ROBOT

CROSS-REFERENCE TO RELATED APPLICATIONS

This application claims priority to Korean Patent Application No. 10-2023-0189945, filed on Dec. 22, 2023, which is hereby incorporated by reference in its entirety.

TECHNICAL FIELD

The present disclosure relates to a server for controlling a plurality of robots that perform loading and unloading of shipments, and more particularly, to a method of operating a server for supporting multi-order picking to allocate a plurality of orders to each robot at one time.

BACKGROUND ART

The conventional process of transporting shipments in warehouses relies mostly on the labor of workers. Although information about shipments is shared remotely through barcode scanning and portable terminals, the labor of workers to pick up and move shipments is still necessary.

Recently, transport of shipments using robots has been developed and introduced, but it is not an easy task to establish a system for linking with a practical warehouse management system (WMS) and for efficient distribution of orders.

DISCLOSURE

Technical Problem

The present disclosure is directed to providing a method of operating a server that supports multi-order picking by performing sorting and grouping on orders included in a number and allocating each group composed of orders to one robot.

The purposes of the present disclosure are not limited to the purpose mentioned above, and other purposes and advantages of the present disclosure which are not mentioned can be understood by the following description, and will be more clearly understood by embodiments of the present disclosure. In addition, it will be easily understood that the purposes and advantages of the present disclosure can be realized by the means and combinations thereof indicated in the claims.

Technical Solution

One embodiment of the present disclosure provides a method of operating a server according to one embodiment of the present disclosure, which includes sorting, by the server, a plurality of orders based on shipments included in each of the plurality of orders, acquiring, by the server, a plurality of groups including one or more consecutive orders from among the plurality of sorted orders, allocating, by the server, the plurality of groups to a plurality of robots such that the groups and robots are matched one-to-one, and allocating, by the server, tasks to the plurality of robots based on the orders included in each group.

The sorting of the plurality of orders may include setting the sorting order of the plurality of orders according to the volume of the shipments included in each of the plurality of orders.

The sorting of the plurality of orders may include setting a sorting order of the plurality of orders according to information on a location where the shipments included in each of the plurality of orders are stored.

In this case, the sorting of the plurality of orders may include sorting orders that commonly include shipments stored in at least one location matching the same picking station, close to each other, based on a picking station matching the location where each of the shipments included in each of the plurality of orders is stored.

The acquiring of the plurality of groups may include determining, in consecutive first and second orders among the plurality of sorted orders, whether the first order and the second order are included in the same group according to a distance between a first location where at least one shipment included in the first order is stored and a second location where at least one shipment included in the second order is stored.

The sorting of the plurality of orders may include selecting, for each of the plurality of orders, a loading type matching the volume of the shipment included in each order among a plurality of loading types for a number of loading boxes loaded on a single robot, and sorting the plurality of orders according to the selected loading type. In this case, the acquiring of the plurality of groups may include setting orders matching the same loading type to form one group according to the loading type matching each of the stored plurality of orders.

The allocating of the tasks to the plurality of robots may include identifying a loading type of each order constituting a group allocated to the first robot, and controlling the first robot to move to a setting station to load a loading box according to the loading type.

The allocating of the tasks to the plurality of robots may include setting a picking order for each shipment according to location information of each of the shipments included in all the orders constituting the group allocated to the first robot, and controlling the first robot to sequentially move to a picking station matching the location where each shipment is stored according to the set picking order and sequentially perform loading for each shipment.

In this case, the allocating of the tasks to the plurality of robots may include transmitting information about the tasks matching the orders constituting the group allocated to the first robot to the first robot, and controlling, when the loading of all the orders within the group allocated to the first robot is completed, the first robot to move to a second target location corresponding to a picking station for performing loading for the shipment corresponding to the next picking order while outputting information about the first target location.

In addition, the allocating of the tasks to the plurality of robots may include transmitting, to the first robot, task information on the orders constituting the group allocated to the first robot, and controlling, when the loading of at least one shipment within the group allocated to the first robot is completed, the first robot to move to a second target location corresponding to a packing station for unloading the shipment while outputting information on the second target location.

Advantageous Effects

As a result of allocating a plurality of orders to each robot according to the control of a server according to the present disclosure, since distribution for each order can be performed simultaneously with picking of each matching order, there is an advantage of cost reduction and increased shipping productivity (processing speed) in that separate distribution is not required after picking all shipments.

As a result of performing, by each robot, multi-order picking according to the control of the server according to the present disclosure, since the movement path of a worker performing picking (loading of the shipment) can be limited in a designated zone, the path can be shortened and the fatigue of the worker can be reduced.

The effects of the present invention are not limited to the effects mentioned above, and other effects that are not mentioned can be clearly understood by a person having ordinary knowledge in the technical field to which the technical idea of the present specification belongs from the description below.

MODES OF THE INVENTION

Figure 1:
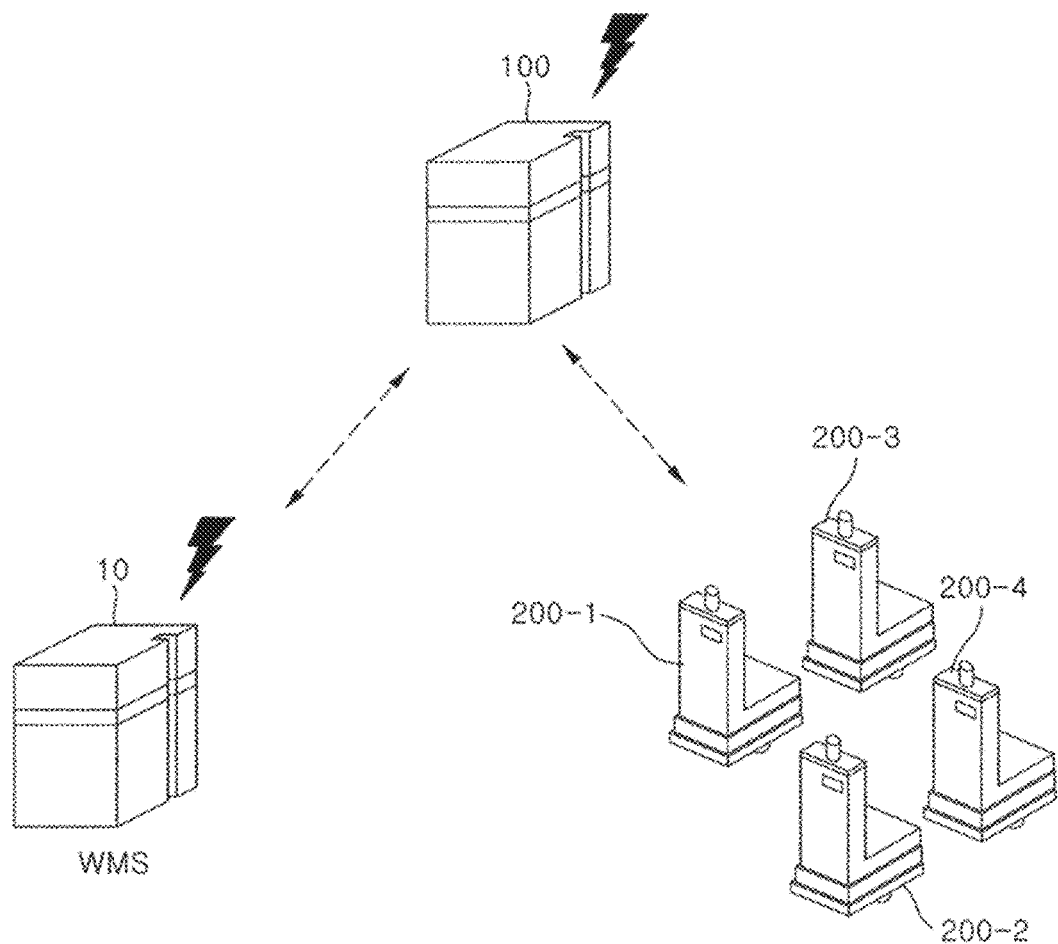
FIG. 1 is a diagram illustrating an operation of a server that identifies a plurality of orders and allocates the plurality of identified orders to a robot according to an embodiment of the present disclosure.

Before describing the present disclosure in detail, the description method of the present specification and drawings will be described.

First, the terms used in the specification and claims are general terms selected in consideration of their functions in various embodiments of the present disclosure. However, these terms may vary depending on the intention of a technician engaged in the relevant technical field, legal or technical interpretation, and the emergence of new technologies. In addition, some terms are arbitrarily selected by the applicant. These terms may be interpreted as defined in this specification, and if there is no specific definition of the term, they may be interpreted based on the overall content of this specification and common technical knowledge in the relevant technical field.

In addition, the same reference numbers or symbols described in each drawing attached to this specification represent parts or components that perform substantially the same function. For the convenience of explanation and understanding, the same reference numbers or symbols are used in different embodiments. In other words, even when components having the same reference numbers are all illustrated in multiple drawings, the multiple drawings do not mean one embodiment.

In addition, terms including ordinal numbers such as "first," "second," etc., may be used in this specification and claims to distinguish between components. These ordinal numbers are used to distinguish between identical or similar components, and the meaning of the terms should not be interpreted in a limited manner due to the use of these ordinals. For example, components combined with these ordinals should not be restricted in terms of the order of use or arrangement, etc., by their numbers. If necessary, each ordinal number may be used interchangeably.

In this specification, singular expressions include plural expressions unless the context clearly indicates otherwise. In this application, terms such as "include" and "comprise" are intended to specify the presence of a feature, a number, a step, an operation, a component, a part, or a combination thereof described in the specification, but should be understood as not excluding in advance the possibility of the presence or addition of one or more other features, numbers, steps, operations, components, parts, or combinations thereof.

In the embodiments of the present disclosure, terms such as "module," "unit," "part," etc., are terms used to refer to components that perform at least one function or operation, and such components may be implemented as hardware or software, or as a combination of hardware and software. In addition, a plurality of "modules," "units," "parts," etc., may be integrated into at least one module or chip and implemented as at least one processor, except in cases where each needs to be implemented as a separate specific hardware.

In addition, in the embodiments of the present disclosure, when it is said that a part is connected to another part, this includes not only a direct connection but also an indirect connection through another medium. In addition, when it is said that a part includes a certain component, it means that it may further include other components, rather than excluding other components, unless there is a specific description to the contrary.

FIG. 1 is a diagram illustrating an operation of a server that identifies a plurality of orders and allocates the plurality of identified orders to a robot according to an embodiment of the present disclosure.

Referring to FIG. 1, a server 100 may communicate with a warehouse management system (WMS) 10 and various robots 200-1, 200-2, 200-3, and 200-4.

The server 100 may be implemented as an electronic device or system including one or more computers. The server 100 may communicate directly/indirectly with the WMS 10 and each of the robots.

One or more loading boxes may be loaded on each of the robots 200-1, 200-2, 200-3, and 200-4 of the present disclosure, and each loading box may be loaded with one or more shipments. The robots 200-1, 200-2, 200-3, and 200-4 of the present disclosure may be operated in a space including at least one setting station, at least one picking station, and at least one packing station. A space where the robots (e.g., 200-1, 200-2, 200-3, and 200-4) are used may correspond to a logistics center, a warehouse, etc., but is not limited thereto.

The setting station refers to a point or area for carrying out a process of loading at least one loading box on the robot. Specifically, the setting station is a place where the loading boxes corresponding to one or more loading types are stored, and the loading boxes suitable for an order allocated to each robot may be loaded onto the corresponding robots according to the operation of a worker.

The setting station may correspond to a waiting station, which will be described below. For example, when a group consisting of a plurality of orders is allocated to a robot located at the waiting station, the worker may load one or more loading boxes onto the robot so that loading is performed according to the plurality of orders included in the allocated group. To this end, the server 100 may transmit information on the loading type (volume and arrangement of the loading boxes, etc.) matching the group (order) allocated to the robot to the terminal of the worker. Alternatively, the robot may display the information on the loading type received from the server 100 and request that the worker load the loading boxes onto the robot.

The picking station refers to a point or area for performing picking to load at least one shipment onto the robot. Specifically, the picking station may be adjacent to at least one location where the shipments are stored or within a certain distance.

The location is a storage location where shipments are stored, and a location code includes a zone/line/aisle, a rack (storage shelf), a row (floor, level), and a column where the shipments are stored. Therefore, a plurality of picking stations may be formed in one zone/line/aisle, and a plurality of picking stations may be formed in one rack.

One picking station may be set to match one or more adjacent locations, but it is also possible for one location to match the plurality of picking stations. When one location matches the plurality of picking stations, there is a case where the robot may move in both directions within a passage formed by two storage shelves. In this case, in a situation where the same item is picked, when entering one side, the robot may stop at a closer one-side picking station and perform picking, and when entering the other side, the robot may stop at a closer other-side picking station and perform picking. In addition, in a case where one robot needs to stop at one or more picking stations to pick at least two or more shipments, when the locations of the shipments are within a certain range, the time required for moving and stopping can be reduced by stopping at one picking station instead of two picking stations, thereby improving productivity.

For example, when the robot is parked at the picking station, the robot may display information on a shipment that needs to be picked (e.g., the type, quantity, and storage location of the shipment) and information on a loading box where the shipment is to be loaded according to the picking (e.g., identification number, location, etc., of the loading box where the shipment is to be loaded among one or more loading boxes loaded on the robot). At this time, the robot may display the information on shipment and loading box on a display, or output the displayed information as a voice through an audio output means such as a speaker. In addition, the robot may drive at least one output means (e.g., optical output element) provided in a target loading box or drive an output means (e.g., optical output element) of the robot adjacent to the loading box to guide the loading box where the shipment is to be loaded. For example, while an optical output element is provided adjacent to each of three loading boxes loaded on the robot, only one of the three loading boxes may be illuminated.

As a result, the worker may identify the information on shipment and loading box displayed through the robot, and take out the shipment from the corresponding location (matching the picking station) and load the shipment into the loading box of the robot.

Meanwhile, the above-described setting station may be provided separately from the picking station, but it is also possible for at least one of the picking stations to be used as a setting station.

The packing station refers to a point or area for unloading the shipments loaded onto the robot by the picking described above. The unloaded shipments may be packed by workers or separate work robots (e.g. robot arms) and transported to the outside.

The WMS 10 is a system for managing the receipt/shipping and inventory of the various shipments related to a target space (e.g. logistics center, warehouse, etc.) where robots operate, and for managing orders, delivery, sales, etc. The order corresponds to orders for one or more shipments.

The WMS 10 may collect order information of various customer in real-time to generate numbers, orders, etc.

Specifically, information on the shipment may be registered on the WMS 10, including identification information of the ordered shipment, the type of the shipment, the expected delivery date of the shipment, the volume of the shipment, the weight of the shipment, and any handling precautions related to the shipment.

The information on the shipment may be registered based on user input, or may be received in real-time from an external server or database that manages delivery tasks. Alternatively, the information on the shipment may be acquired as a result of scanning shipping instructions related to the delivery work of at least one shipment through a scanning unit (e.g., an image sensor, an infrared sensor, a barcode sensor, etc.) of at least one electronic device that can communicate with the WMS 10.

The WMS 10 may sequentially generate numbers including a plurality of orders based on the type of the shipment, the expected delivery date, the order sequence, etc., and may provide information on the plurality of orders included in each number to the server 100.

The server 100 may activate a number selected based on user input among the generated at least one number, and allocate each order included in the number to at least one robot.

To this end, the server 100 may receive user input for activating the at least one number through a user terminal, such as those used by site managers or operators. At this time, a separate external server linked with the user terminal of the site manager or operator may be utilized to provide a list of orders constituting the generated number, and receive the user input for activating the at least one number. The external server may provide information on the currently generated number to the user terminal in the form of a web page or application.

The server 100 may generate tasks and allocate the AI-generated tasks to the robot to process the plurality of orders per one robot. For example, each robot may sequentially move to a picking station matching the location where the shipments included in each of the plurality of orders are stored, and perform loading (picking) of shipments corresponding to the plurality of orders at once. In order to perform multi-order picking for processing the plurality of orders at once per individual robot, a plurality of loading boxes may be loaded on each of the robot 200-1, 200-2, 200-3, and 200-4.

Figure 2:
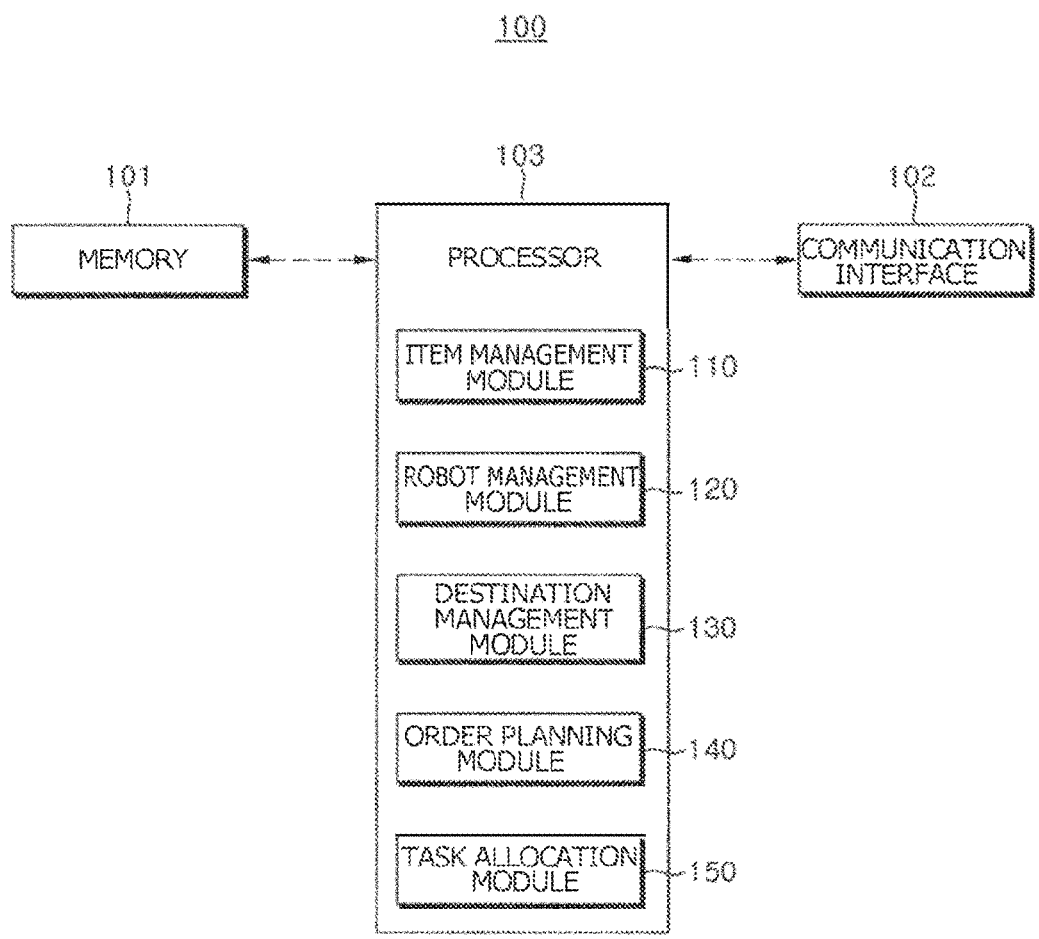
FIG. 2 is a block diagram illustrating a configuration of a server according to an embodiment of the present disclosure.

FIG. 2 is a block diagram illustrating a configuration of a server according to an embodiment of the present disclosure.

Referring to FIG. 2, the server 100 may include a memory 101, a communication interface 102, and a processor 103.

The memory 101 is a component for storing an operating system (OS) for controlling the overall operation of the components of the server 100 and at least one instruction or data related to the components of the server 100.

The memory 101 may include a non-volatile memory such as a read-only memory (ROM), a flash memory, etc., and may include a volatile memory such as a dynamic random access memory (DRAM). In addition, the memory may include a hard disk, a solid state drive (SSD), etc.

The memory 101 may include information on the generated number, the activated number, and the plurality of orders constituting each number, and include information on the real-time status of the robot, the station (picking station, packing station), etc.

The communication interface 102 may include a circuit, a module, a chip, etc., for performing communication with at least one external device (an external server, a robot, etc.) through various wired and wireless communication methods.

The communication interface 102 may be connected to an external device through various networks.

The network may be a personal area network (PAN), a local area network (LAN), a wide area network (WAN), etc., depending on the area or scale, and may be the Intranet, the Extranet, or the Internet depending on the openness of the network.

The communication interface 102 may be connected to external devices through various wireless communication methods such as long-term evolution (LTE), LTE Advance (LTE-A), 5th generation (5G) mobile communication, code division multiple access (CDMA), wideband CDMA (WCDMA), universal mobile telecommunications system (UMTS), wireless broadband (WiBro), global system for mobile communications (GSM), time division multiple access (DMA), Wi-Fi, Wi-Fi Direct, Bluetooth, near field communication (NFC), ZigBee, etc.

Through the communication interface 102, the server 100 may communicate with various external systems (e.g., a WMS) and also directly/indirectly communicate with various robots. In addition, the server 100 may also communicate with one or more worker terminals through the communication interface 102.

The processor 103 is a component for controlling the overall operation of the server 100. Specifically, the processor may be connected to a memory, and perform operations according to various embodiments of the present disclosure by executing at least one instruction stored in the memory.

The processor 103 may include a general-purpose processor such as a central processing unit (CPU), an access point (AP), a digital signal processor (DSP), a graphics-specific processor such as a graphics processing unit (GPU), a vision processing unit (VPU), or an AI-specific processor such as a neural network processing unit (NPU). The AI-specific processor may be designed as a hardware structure specialized for training or using a specific AI model.

Referring to FIG. 2, the processor 103 may control an item management module 110, a robot management module 120, a destination management module 130, an order planning module 140, a task allocation module 150, etc. Each of these modules may be implemented as hardware and/or software.

The item management module 110 is a module for managing information on shipments.

Specifically, the item management module 110 may receive information in real-time, such as the type, volume, and quantity of shipments stored in each location (storage location), and store and manage the received information. To this end, the server 100 may receive information on added shipments from an external electronic device (e.g., an external server, a user terminal, etc.).

In addition, the item management module 110 may store information on numbers and orders generated by the WMS 10, and manage the progress status of each number in real-time. For example, the item management module 110 may activate at least one number based on user input (e.g., received via the user terminal of a site manager) and update the progress status of the number from "waiting" to "in progress." When all the orders within the number are completed, the process status of the number may be updated to "completed."

For example, when user input for sequentially activating a first number and a second number is received, the item management module 110 may set the progress status of the first number to "in progress" and set the progress status of the second number to "waiting" until the first number is completed. When the first number is completed, the module may activate the second number and set the progress status of the second number to "in progress." However, it is also possible to preemptively cancel the activation of the second number according to the user input during the waiting process of the second number.

The robot management module 120 is a module for managing the status of each robot and events that occurred for each robot in real-time. To this end, the robot management module 120 may receive information on the status and events of the robot from each robot or a robot control system that controls each robot.

The robot management module 120 may identify the location of each robot, whether there is a task allocated to each robot, the progress status of the task allocated to each robot, etc. In addition, the robot management module 120 may identify events that occurred for each robot (e.g., occurrence of idle state, battery shortage, loading completion of a loading box, loading completion of a shipment, whether the loading box is full, etc.). For this purpose, the robot management module 120 may directly/indirectly communicate with each robot.

The destination management module 130 is a module for managing information on a map of a space where robots operate, a path along which the robots may move on the map, a picking station, a packing station, a setting station, a waiting station, etc.

The order planning module 140 is a module for performing sorting and grouping of the orders included in the current number, and allocation of the grouped orders to the robots.

The order planning module 140 may sort a plurality of orders included in an order. At this time, the order planning module 140 may set the sorting order of multiple orders according to the type of shipment included in each order, the volume of shipment included in each order, the storage location of shipment included in each order, the location of the picking station for loading shipment included in each order, etc.

In addition, the order planning module 140 may perform grouping on the plurality of sorted orders to divide the plurality of orders into a plurality of groups. At this time, each group may include one or more orders, and grouping of orders may be performed according to the number, type, volume, etc., of the shipments included in the order, or a single order may be allocated to the robot. Specifically, the order planning module 140 may divide the groups according to the overlap or distance between the location information of the shipments included in each order (e.g., the location of the picking station matching the storage location of each shipment), but is not limited thereto.

The order planning module 140 may allocate a plurality of groups to a plurality of robots one-to-one, ensuring that the orders included in each group are allocated to at least one robot. At this time, one group may be allocated to one robot.

Specifically, the order planning module 140 may compare the location information of the shipments included in the orders constituting each group (the location of the picking station matching the location where the shipments are stored) with the current location of each robot to allocate each of the groups to one of the robots.

At this time, the order planning module 140 may identify a loading type suitable for each robot according to the group of the orders allocated to each robot. The loading type is a concept defined according to the number, arrangement, size, etc., of the loading boxes loaded on a single robot. For example, since the loading space for a single robot is limited, when large loading boxes are loaded, the number of loading boxes may be relatively small, and when small loading boxes are loaded, the number of loading boxes may be relatively large, so that various loading types can be applied to each robot.

The task allocation module 150 is a module for allocating tasks to each robot according to the order allocated to each robot. The tasks may include a picking task for allowing the robot to move to a picking station matching the location where the shipment included in the order is stored and performing loading, a packing task for allowing the robot to move to an unloading location while the shipment is loaded and performing unloading, etc. In addition, the tasks may include a setting task for allowing the robot to move to a setting station and performing loading on the loading box before performing the picking task.

In relation to the setting task, the task allocation module 150 may transmit information on the loading type identified for the robot to the robot and/or the terminal of a worker performing the loading of the loading box for the robot. As a result, one or more loading boxes matching the loading type suitable for the allocated group may be loaded on each robot.

As an example, the task allocation module 150 may set a picking order for each shipment included in the orders in the group allocated to the robot according to the storage location of each shipment. For example, the picking order may be set so that the robot's movement path is minimized according to the location of the picking station for sequential movement to load the shipment included in each order, but is not limited thereto.

When the picking order is set in this way, the task allocation module 150 may transmit task information according to the set picking order to the robot. Specifically, the task allocation module 150 may sequentially allocate a plurality of picking tasks so that the robot sequentially moves to the picking station matching the storage location of the shipment included in each order according to the picking order and performs loading. At this time, as a result of designating one order for each loading box included in the robot, the picking task for the shipment included in one order may be mapped for each loading box. However, it is also possible for one order to be designated for two or more loading boxes.

When picking for all of the shipments included in each order within the allocated group is completed (shipments are loaded into each loading box), the server 100 may allocate the packing task to the robot to move to at least one packing station and unload the shipments.

As described above, the server according to the present disclosure has the advantage of improving the work efficiency of robots and workers by implementing multi-order picking that allows each robot to perform picking for multiple orders at once.

Figure 3:
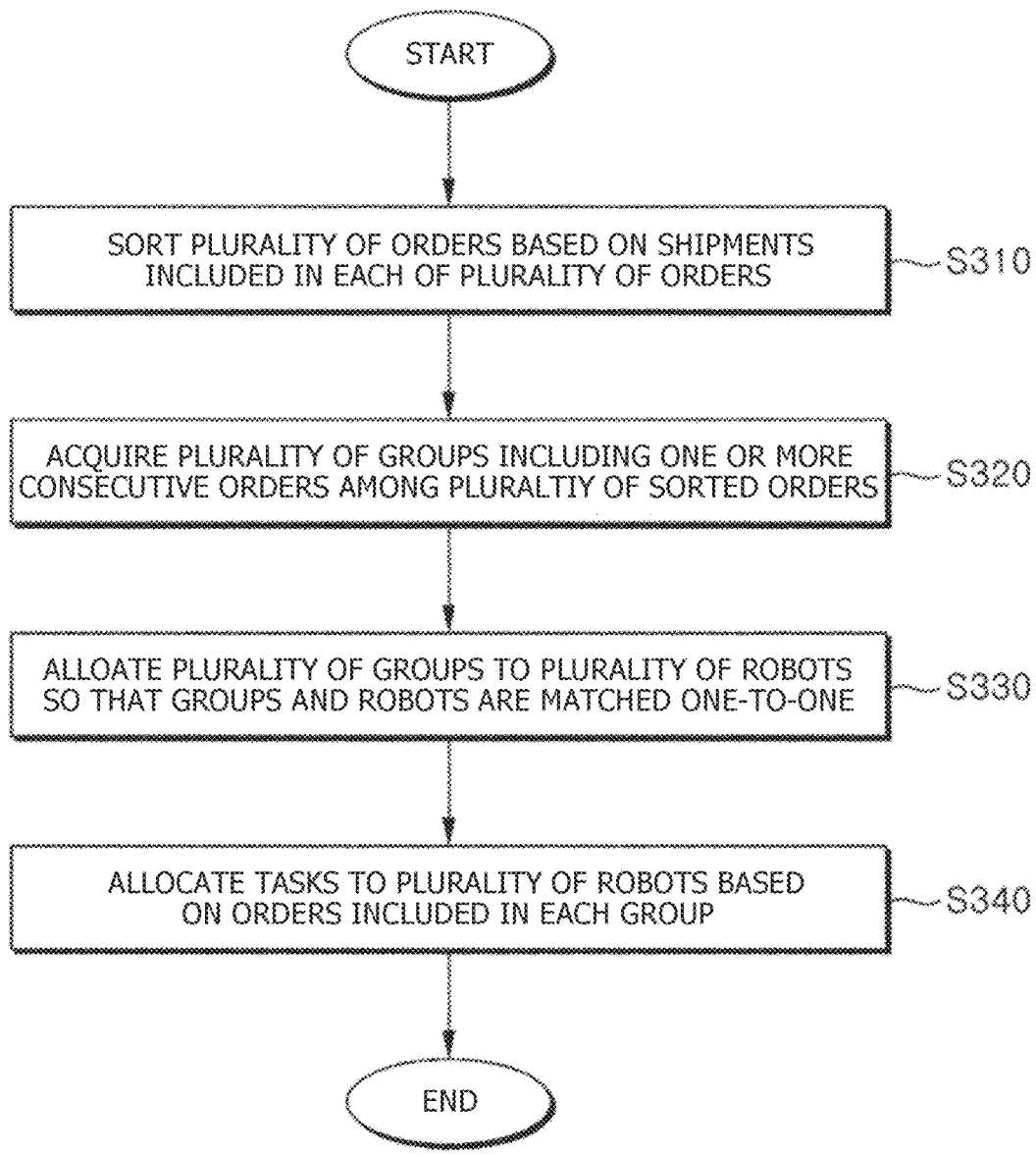
FIG. 3 is a flowchart illustrating an operation of a server according to an embodiment of the present disclosure.

FIG. 3 is a flowchart illustrating, a sequential operation of a server including the modules described above in more detail according to one embodiment of the present disclosure.

Referring to FIG. 3, in operation S310, the order planning module 140 may sort a plurality of orders based on the shipments included in each of the plurality of orders.

At this time, the plurality of orders to be sorted may correspond to a plurality of orders included in a currently activated (: in progress) number. At this time, it is also possible for two or more numbers to be performed simultaneously, not just one order. When two or more numbers are performed simultaneously, order planning for each number may be performed for the orders included in each number. For example, in first and second numbers that are each in progress, when there are 100 orders in the first number and 150 orders in the second number, the order planning modules for the 100 orders and the order planning modules for the 150 orders may each be performed simultaneously.

The order planning module 140 may set the sorting order of the plurality of orders based on the location information where each of the shipments included in each of the plurality of orders is stored. The location information may include the location where the shipments included in each of the plurality of orders are stored or the identification information/location of the picking station matching the location where the shipments included in each of the plurality of orders are stored.

For example, the order planning module 140 may sort orders that commonly include shipments stored in at least one location matching the same picking station, close to each other, based on the picking station matching the location where each of the shipments included in each of the plurality of orders is stored, and prevent orders that do not commonly include the shipments with the same location information from being sorted close to each other. At this time, the more shipments that have the location information in common, the closer to each other the orders may be sorted.

Specifically, the order planning module 140 may generate a matrix in which identification information (e.g., order 1, order 2, order 3, . . . ) of each of the plurality of orders is matched to rows and location information (e.g., storage locations of shipments, or picking stations matching storage locations of shipments) (e.g., A-1, A-2, A-3, B-1, B-2, . . . ) where various shipments may be stored is matched to columns.

For example, when order 1 includes shipment a1 (picking station A-1) and shipment a2 (picking station A-2), respectively, the value of a column corresponding to A-1 and A-2 in a row matching order 1 may be "1." For example, when order 2 includes shipment b2 (picking station B-1) and shipment b7 (picking station B-1), the value of a column corresponding to B-1 in a row matching order 2 may be "2."

When the matrix is generated in this manner, the order planning module 140 may sort each order by performing sorting on the generated matrix according to a location, which is the storage location of the order and the shipment within the order.

Figure 4:
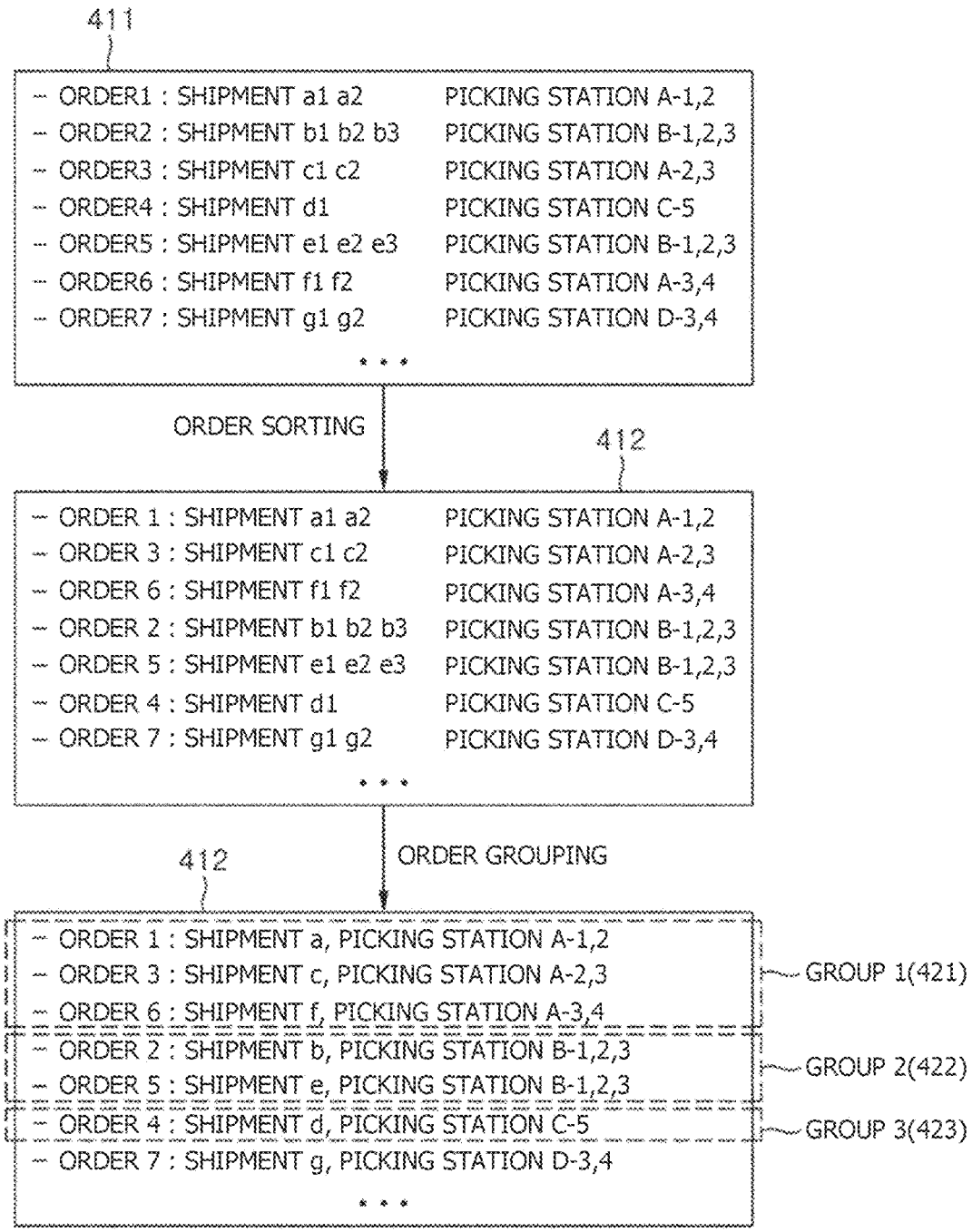
FIG. 4 is a diagram illustrating an example of an operation in which a server according to an embodiment of the present disclosure sorts and groups a plurality of orders according to a storage location.

FIG. 4 is a diagram illustrating an example of an operation of a server according to an embodiment of the present disclosure for sorting and grouping a plurality of orders according to location information of shipments included in each order.

A list 411 of orders corresponding to a number before sorting may include the types of shipments included in each order (e.g., a1, a2, b1, b2, b3, c1, . . . ), identification information/location of the picking station matching a location where the shipments included in each order are stored (e.g., A-1, A-2, B-1, B-2, B-3, C-1, C-2, etc.). For example, the storage location of shipment a1 included in order 1 of FIG. 4 may match picking station A-1, and the storage location of shipment a2 may match picking station A-2.

The initial list 411 may be obtained by simply sorting orders according to the generation order (e.g., Identification numbers of orders) or the type of the shipment.

Referring to FIG. 4, the order planning module 140 may obtain a list 412 obtained by changing the sorting order of the above-described list 411 so that order 1 and order 3, which have the overlapping picking station A-2, are placed close to each other, order 3 and order 6, which have the overlapping picking station A-3, are placed close to each other, and order 2 and order 5, which have the overlapping picking stations B-1, 2, and 3, are placed close to each other. At this time, the sorting order may be set according to the similarity between the orders.

Meanwhile, as another embodiment, the order planning module 140 may identify the intermediate location with respect to the location of the picking station of at least one shipment included in each order. The order planning module 140 may also sort the plurality of orders so that distances of the intermediate locations of two consecutive orders among the plurality of orders within the list 411 are calculated and the sum of the distance thereof is minimized. As a specific example, when the orders are sorted in the sequence of order 1, order 2, and order 3, sorting may be performed so that the sum of a first distance between the intermediate locations of the first order and the second order and a second distance between the intermediate locations of the second order and the third order is minimized.

Meanwhile, referring to FIG. 3, in operation S320, the order planning module 140 may obtain a plurality of groups including one or more consecutive orders among the plurality of sorted orders.

In one embodiment, the order planning module 140 may set the maximum number of orders constituting each group based on the maximum number of loading boxes that may be loaded onto each of a plurality of robots. For example, when up to 6 loading boxes may be loaded onto each robot, the order planning module 140 may set the maximum number of the orders constituting each group to 6.

During a process of dividing the previously sorted orders into a plurality of groups, the order planning module 140 may sequentially group the sorted orders according to their continuous order to obtain the plurality of groups.

Specifically, referring to FIG. 4, the order planning module 140 may set a plurality of groups 421, 422, and 423 so that orders including overlapping location information are in the same group.

For example, order 3 and order 6, which are sorted consecutively and commonly include shipments corresponding to picking station A-3, are set to the same group 421. However, even though order 6 and order 2 are consecutive, they do not have any overlapping picking stations and are thus set to separate groups 421 and 422, respectively.

Alternatively, a case where a plurality of orders have been sorted as described above is assumed.

At this time, after sorting the orders, it is highly likely that orders placed close to each other may have a high degree of similarity. However, even though the orders may be placed close to each other, their similarity may not always be high.

The order planning module 140 may calculate the similarity between orders that are placed close to each other in the plurality of sorted orders. For example, the similarity may be measured by measuring the cosine value according to the angle between vectors composed of rows matching each order, but is not limited thereto.

Here, the order planning module 140 may set the consecutive orders to the same group when the similarity between adjacent (consecutive) orders is greater than or equal to a threshold.

Alternatively, the order planning module 140 may determine whether the consecutive orders are included in the same group based on a distance between the picking stations matching the storage location of the shipment included in each of the consecutive orders.

For example, when the distance between the picking stations of the shipments included in each of two consecutive orders is less than a certain distance, the orders may be included in the same group.

As a specific example, when the distance between the picking stations matching the shipments included in each of the consecutive orders 3 and 6 in the list 412 of FIG. 4 is greater than or equal to a certain distance, the order planning module 140 may allocate order 3 and order 6 to different groups, unlike FIG. 4. For example, it is also possible that only orders 1 and 3 are included in group 1, and orders 6, 2, and 5 are included in group 2 (822).

Meanwhile, according to one embodiment of the present disclosure for operations S310 to S320, the server 100 may sort and group a plurality of orders based on the volume of the shipment included in each order or the sum thereof.

In the case of that in FIG. 4, the server 100 does not receive information on the volume of the shipment included in each order from the WMS 10, or does not use the information on the volume even when the server 100 receives the information on the volume. However, when the information on the volume of the shipment is received from the WMS 10, the order planning module 140 of the server 100 may sort and group the orders according to the volume of the shipment included in each order.

Specifically, the order planning module 140 may set the sorting order of the plurality of orders according to the volume of the shipment included in each order. For example, the order planning module 140 may select the type of the loading box that matches the sum of the volumes of the shipments included in each order among the loading boxes of various volumes (sizes).

At this time, for each order, the order planning module 140 may select at least one type of the loading boxes in which all shipments included in the order may be loaded. Specifically, the order planning module 140 may select the loading box type according to predetermined worker's setting criteria. For example, the loading box type with the minimum volume in which all the shipments included in the order may be loaded may be selected, or the loading box type that is one size larger than the loading box type with the minimum volume in which all the shipments included in the order may be loaded may be selected. Alternatively, regardless of the volume sum, the loading bin type with the maximum size may be selected, or the loading box type with a certain size may be selected.

At this time, the order planning module 140 may sort the plurality of orders so that orders matching the same type of the loading box are placed close to each other.

Figure 5:
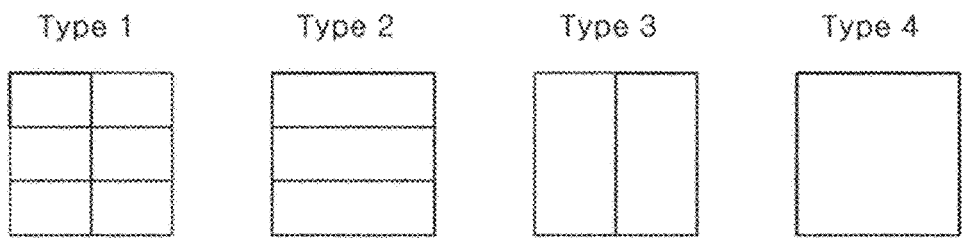
FIG. 5 is a diagram illustrating an example of an operation in which a server according to an embodiment of the present disclosure sorts and groups a plurality of orders according to the volume of a shipment in a situation where only the same type of loading box may be loaded on a single robot according to an embodiment of the present disclosure.
Figure 5:
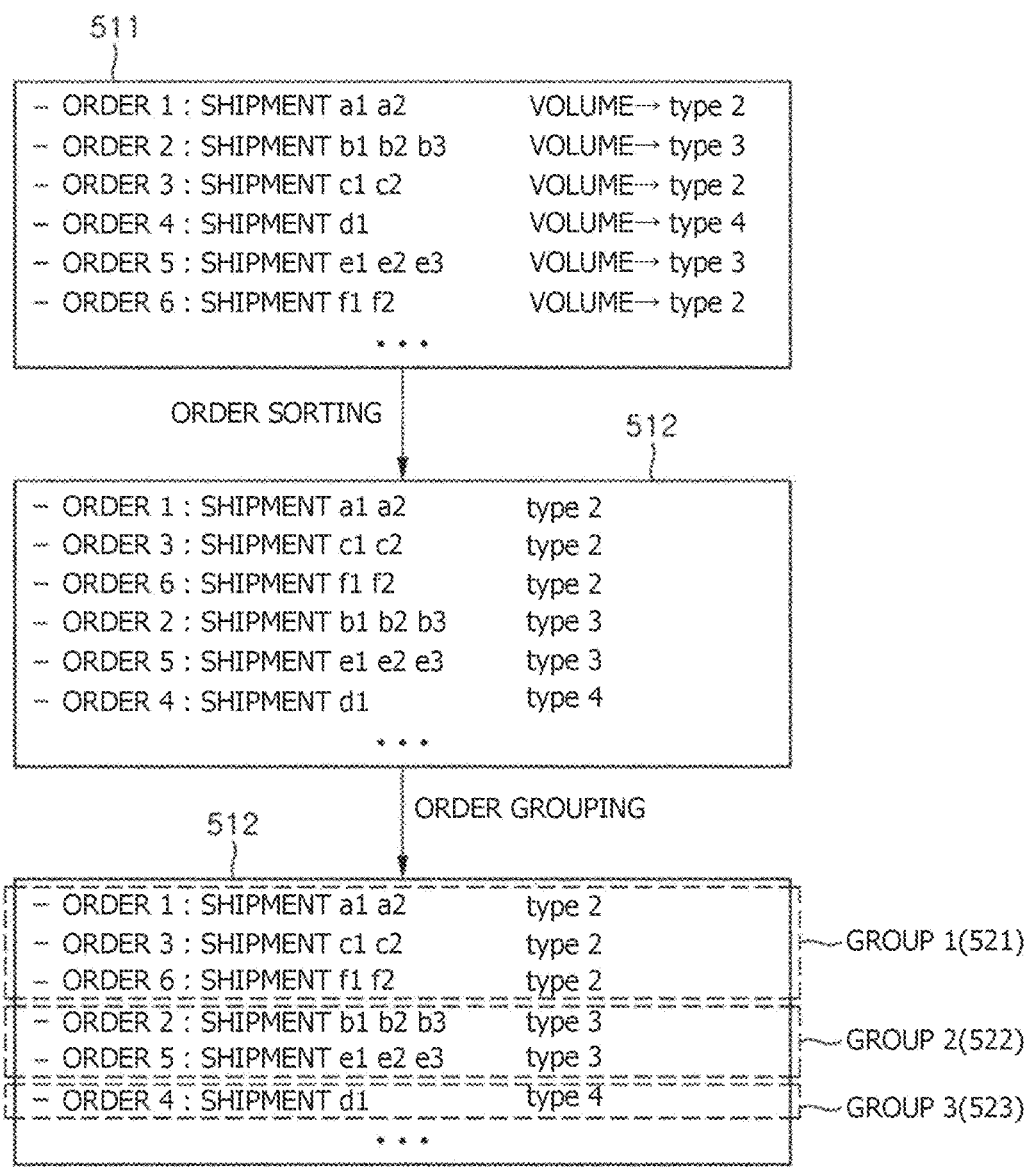

In this regard, FIG. 5 is a diagram illustrating an example of an operation of a server according to an embodiment of the present disclosure for sorting and grouping a plurality of orders according to the volume of shipments. FIG. 5 assumes a situation in which only the same type of loading boxes may be loaded on one robot among a plurality of robots 200-1, 200-2, 200-3, 200-4, . . . . The loading boxes with the same type refer to loading boxes having the same volume (size) and shape.

Referring to FIG. 5, depending on various loading types (tote types) such as type 1, 2, 3, and 4, each robot may be loaded with at least one loading box to a maximum of 6 loading boxes. At this time, the number of loading boxes loaded on each robot varies depending on which type of loading box is loaded.

Here, the order planning module 140 may select the loading type matching each order according to the volume of each shipment included in each order.

For example, referring to FIG. 5, the sum of the volumes of shipments a1 and a2 included in order 1 may be greater than the volume of the loading box corresponding to type 1, but less than the volume of the loading box corresponding to type 2. In this case, the loading type matching order 1 may be selected as type 2.

As described above, the loading type matching each order may be identified in the initial list 511, and the order planning module 140 may perform sorting of orders based on the loading type matching each order. Specifically, the sequence of orders may be set so that the orders corresponding to the same loading type are placed close to each other.

For example, as shown in FIG. 5, an updated list 512 in which the sequence of orders is sorted according to the loading type may be obtained.

At this time, the order planning module 140 may set the orders matching the same loading type to form one group according to the loading type matching each of the plurality of sorted orders.

In this case, the maximum number of orders that may be included in each group may vary depending on the loading type. For example, a group corresponding to type 1 may include up to 6 orders, and a group corresponding to type 2 may include up to 3 orders.

As a result, as shown in FIG. 5, grouping may be completed according to the loading type, and groups 521, 522, and 523 may be generated.

Meanwhile, the order planning module 140 according to one embodiment of the present disclosure may perform order sorting and grouping by applying both the volume of the shipment included in each order and the location information of the shipment.

That is, the order planning module 140 may perform sorting and grouping so that both a condition that orders with the same loading type according to the volume of the shipment are sorted close to each other and formed into the same group and a condition that location information (e.g., picking station matching the storage location of the shipment) of the shipment is overlapped or the closest orders are sorted close to each other to form the same group are satisfied.

Figure 6:
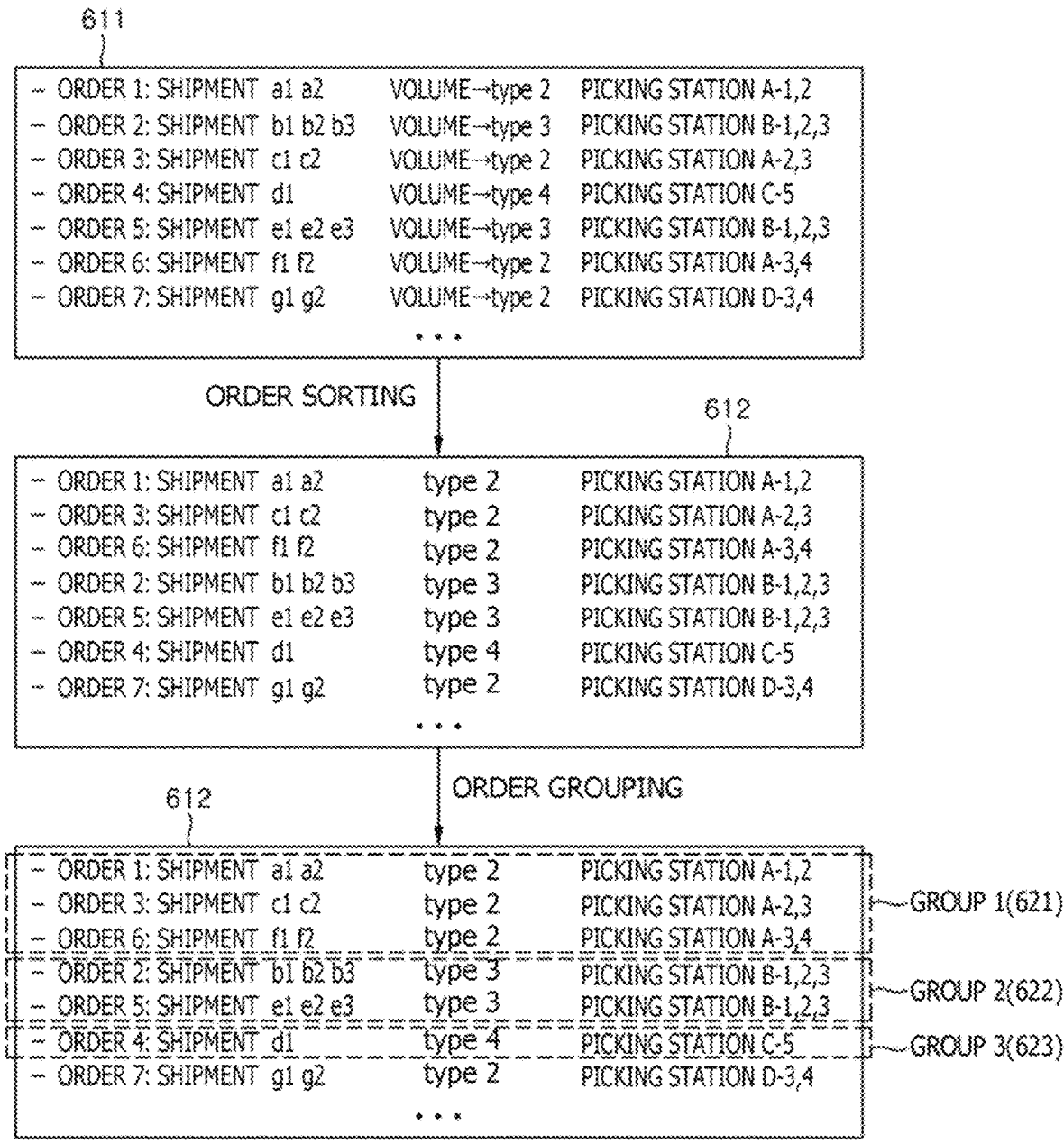
FIG. 6 is a diagram illustrating an example of an operation in which a server according to an embodiment of the present disclosure sorts and groups a plurality of orders according to the volume and storage location of a shipment in a situation where only the same type of loading box may be loaded on a single robot according to an embodiment of the present disclosure.

In this regard, FIG. 6 is a diagram illustrating an example of an operation of a server according to an embodiment of the present disclosure for sorting and grouping a plurality of orders according to the volume and storage location of shipment. FIG. 6 also assumes a situation where only the same type of loading boxes can be loaded on one robot.

Referring to FIG. 6, the order planning module 140 may identify the loading type according to the volume of the shipment included in each order in a list 611, as well as identify the storage location of the shipment included in each order.

At this time, the order planning module 140 may obtain an updated list 612 by first sorting orders corresponding to the same loading type to be close to each other, and secondarily sorting orders where at least one picking station overlaps each other to be close to each other.

The order planning module 140 may perform grouping according to the sorted order so that orders where the loading type and picking station overlap are included in the same group. As a result, a plurality of groups 621, 622, and 623 can be obtained.

When the plurality of groups are obtained according to at least one of the above-described embodiments, the order planning module 140 may allocate the plurality of groups to a plurality of robots so that the groups and robots are matched one-to-one (see S330 of FIG. 3).

At this time, the group may be allocated only to a robot that is waiting without a separate allocated task, or the group of the orders to be performed next may be allocated in advance to at least one robot that is currently performing at least one task (e.g., picking task, unloading task, etc.). However, the group of the orders may be allocated preferentially to the robot that is waiting.

In one embodiment, the order planning module 140 may allocate a plurality of groups to a plurality of robots based on the location of the picking station matching at least one shipment included in the orders constituting each group and the current location of each of the plurality of robots.

Specifically, the task allocation module 150 may compare the location of the picking station matching the location where each of the shipments included in the orders constituting each group is stored, with the current location of each of the plurality of robots.

For example, the average value for the locations of the picking stations matching the shipments included in each order may be compared with the current location of each robot, or the location of the picking station closest to each robot among the picking stations matching each of the shipments included in each order may be compared with the current location of each robot.

Here, the task allocation module 150 may minimize the movement path of the robot by allocating each group to the robot with the smallest difference according to the above-described comparison.

Figure 7:
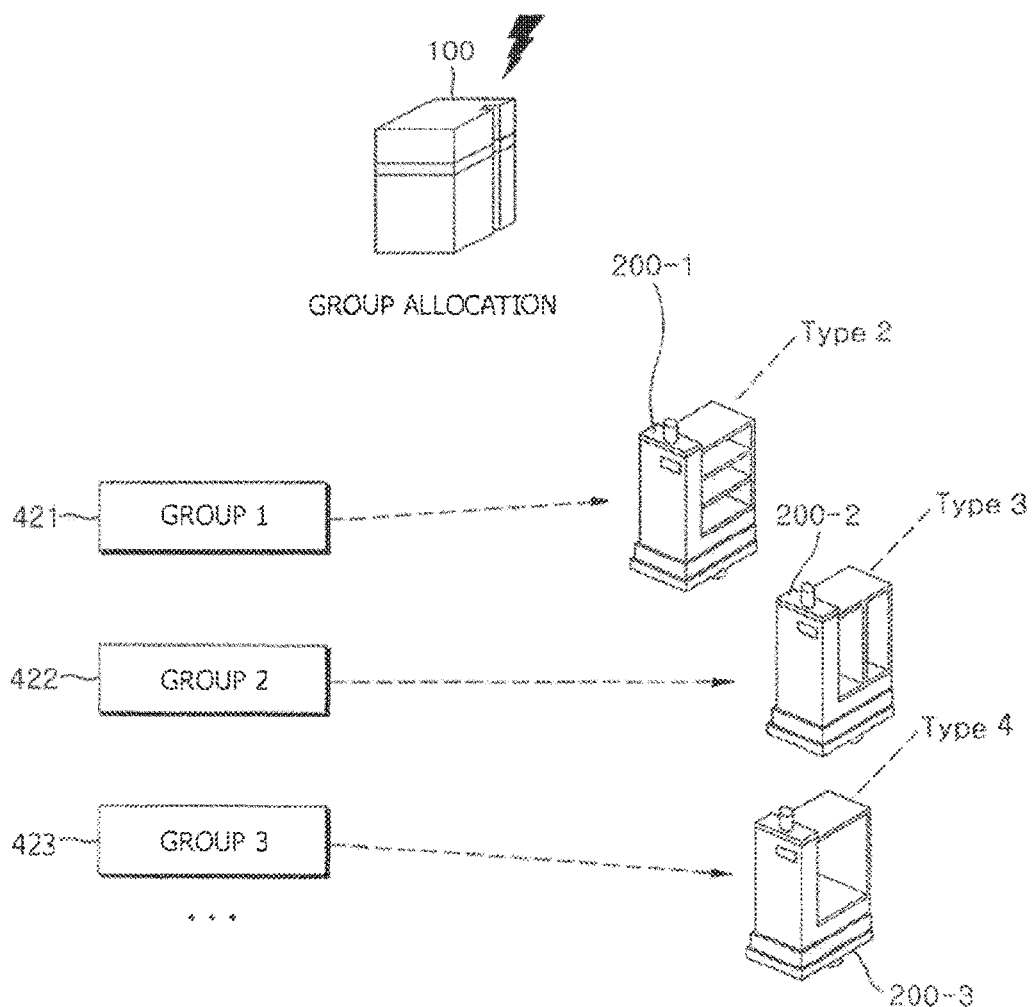
FIG. 7 is an exemplary diagram illustrating an operation in which a server according to an embodiment of the present disclosure allocates each group to one robot.

In this regard, FIG. 7 is a diagram illustrating the operation of a server according to one embodiment of the present disclosure for allocating each group to one robot.

Referring to FIG. 7, the order planning module 140 may allocate each of groups 621, 622, and 623 generated in the above-described FIG. 6 to one robot 200-1, 200-2, or 200-3.

At this time, the order planning module 140 may transmit information on the loading type matching each of the groups to one of the robots or to the terminal of a worker performing loading of the loading box for each robot. Here, the information on the loading type may include information on the volume (size) and number of loading boxes.

The order planning module 140 may identify the loading type of each order constituting the group allocated to each robot, and control each robot to perform loading of the loading box according to the loading type.

For example, the task allocation module 150 may identify the loading type (type 2) of the order constituting the group allocated to the robot 200-1 and control the robot 200-1 to move to a setting station (which may be a waiting station) to load the loading box according to the identified loading type (type 2). At this time, one or more orders or shipments may be allocated to each loading box to be loaded on the robot 200-1.

To this end, the task allocation module 150 may set the destination of the robot 200-1 corresponding to the setting station through the destination management module 130. As a result, the robot 200-1 may move to the setting station corresponding to the destination. At this time, the movement path for moving to the setting station may be generated by the task allocation module 150 or may be generated through a separate server/system that performs robot control.

When the robot 200-1 is located at the setting station, the loading boxes corresponding to the loading type may be loaded as a result of displaying information on the loading type through the robot 200-1.

In this manner, the loading boxes corresponding to the loading type of the group allocated to each robot may be loaded onto each robot. For example, the robot 200-1 may be loaded with loading boxes (e.g., 3 boxes) corresponding to the loading type of type 2, and the robot 200-2 may be loaded with loading boxes (e.g., 2 boxes) corresponding to the loading type of type 3.

Meanwhile, unlike the above-described embodiments, when different types of loading boxes may be loaded on one robot, orders of different loading types may be included in the same group.

Figure 8:
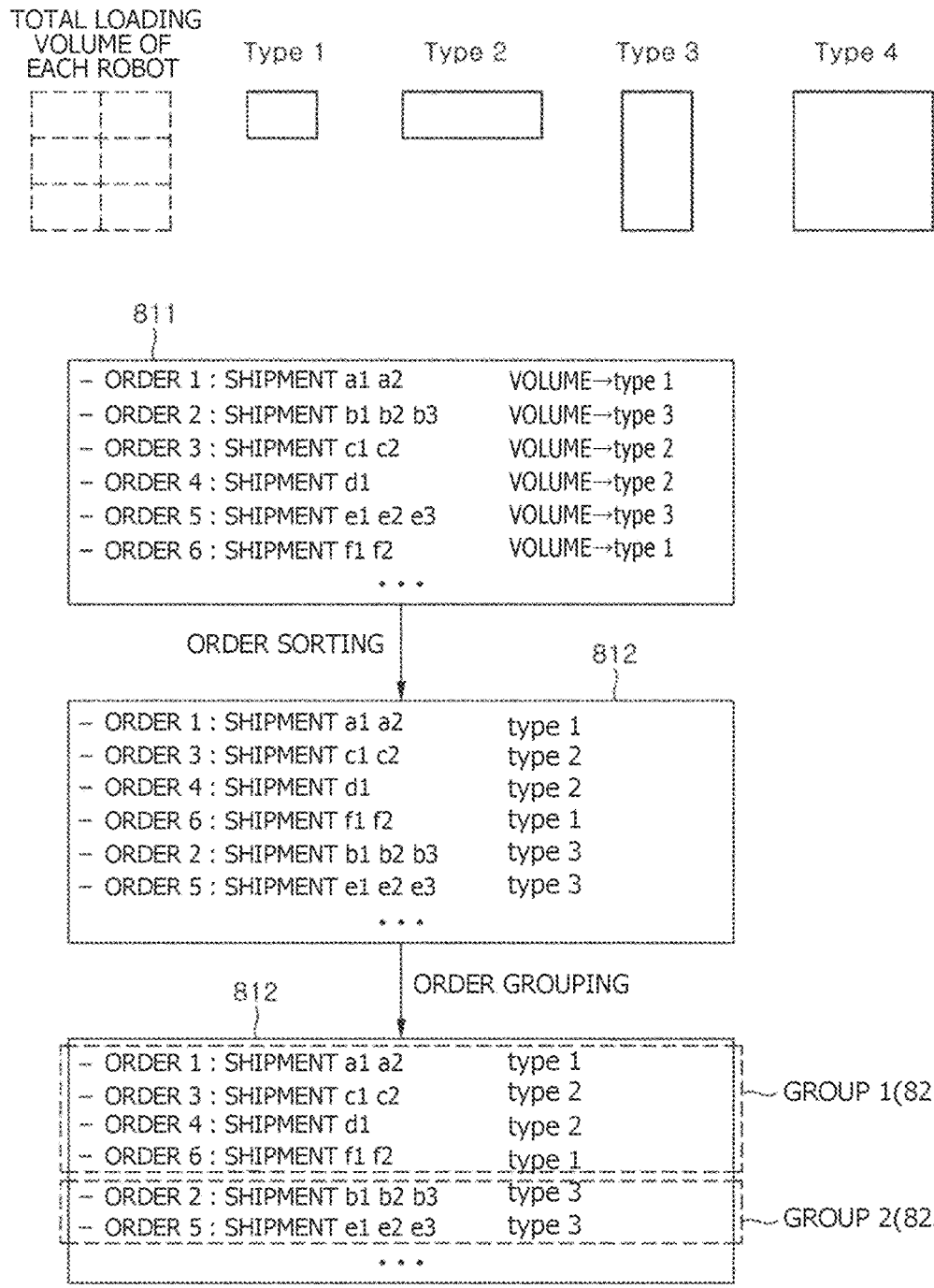
FIG. 8 is a diagram illustrating an example of an operation in which a server according to an embodiment of the present disclosure sorts and groups a plurality of orders according to the volume of a shipment in a situation where different types of loading boxes may be loaded on a single robot according to an embodiment of the present disclosure.

In this regard, FIG. 8 is a diagram illustrating an example of an operation of a server according to an embodiment of the present disclosure for sorting and grouping a plurality of orders according to the volume of shipment in a situation where different types of loading boxes may be loaded on one robot according to an embodiment of the present disclosure.

Referring to FIG. 8, the same type of loading boxes may be loaded on each robot, but various combinations of loading boxes may be loaded, such as a combination composed of two loading boxes of type 1 and two loading boxes of type 2, a combination comprised of three loading boxes of type 1 and one loading box of type 3, etc. In this regard, the order planning module 140 may manage information on the plurality of combinations of loading box configurations that may be loaded on each robot. The information on the plurality of combinations may be pre-stored in the memory 101.

Referring to FIG. 8, in the initial list 811, the order planning module 140 may identify the loading type matching each order according to the volume of the shipment included in each order.

At this time, the order planning module 140 may sort a plurality of orders to allow the loading boxes of coexisting types to be close to each other and to prevent the loading boxes of non-coexisting types from being close to each other.

For example, referring to the shape of the total loading volume of each robot in FIG. 8, it is confirmed that type 1 can coexist with type 2 and type 3, but type 2 and type 3 cannot coexist with each other. Meanwhile, the loading box of type 4 cannot coexist with any type.

In this case, the order planning module 140 may change the sorting order so that the order of type 1 may be close to both the orders of type 2 and type 3, but the orders of type 2 and type 3 cannot be close to each other. As a result, an updated list 812 as in FIG. 8 may be obtained.

The order planning module 140 may set each group so that consecutive orders are formed into one group within the (updated) list 812 in which the orders are sorted, but may set each group to include only types of loading boxes that can coexist with each other. In addition, the order planning module 140 may form each group, when combining the loading boxes matching each order constituting one group, to satisfy a condition where the combined loading boxes does not exceed the total loading volume of each robot.

For example, two loading boxes of type 1 and two loading boxes of type 2 can be combined, but three loading boxes of type 1 and two loading boxes of type 2 cannot be combined so as not to exceed the total loading volume of one robot, and thus cannot be included in one group.

To this end, the order planning module 140 may identify whether grouping is possible by comparing the combination of the loading boxes related to the consecutive orders with the above-described multiple combinations.

Specifically, the order planning module 140 may sequentially identify whether grouping is possible between the consecutive orders based on the type of the loading box matching each of the plurality of sorted orders.

Referring to FIG. 8, the order planning module 140 may identify whether there is at least one combination that includes loading boxes type 1 and type 2 matching each of order 1 (the first order) and order 3 (the second order) among the plurality of combinations.

When there is the at least one combination, the order planning module 140 may identify whether there is at least one combination that includes all of the loading boxes (type 1, type 2, and type 2) matching the orders including order 1 and order 3, as well as order 4 (the third order).

When there is the at least one combination, the order planning module 140 may identify whether there is the at least one combination that includes all of the loading boxes (type 1, type 2, type 2, and type 1) matching the orders including orders 1, 3, and 4, as well as order 6 (the fourth order).

When there is the at least one combination, the order planning module 140 may identify whether there is the at least one combination that includes all of the loading boxes (type 1, type 2, type 2, type 1, and type 3) matching the orders including orders 1, 3, 4, and 6, as well as order 2.

However, since there is no combination in which all of the loading boxes of type 1, type 2, type 2, type 1, and type 3 coexist, in this case, the order planning module 140 may obtain group 1 (821) to include the largest number of consecutive orders (orders 1, 3, 4, and 6) under the condition that the combination exists.

Similarly, the order planning module 140 may perform grouping by repeating the above-described process again, starting with the first order, order 2, which is currently not grouped.

As a result, the group 821 including different types of orders and a group 822 including only two orders of type 3 may be obtained, respectively.

Meanwhile, even in the case where different types of loading boxes can be loaded on one robot, the order planning module 140 according to one embodiment of the present disclosure may perform order sorting and grouping by considering not only the volume of the shipment included in each order but also the location information of the shipment (e.g., the picking station matching the location where the shipment is stored).

That is, the order planning module 140 may perform sorting and grouping to satisfy both a condition that coexisting orders are closely sorted and formed into the same group according to the loading type matching the volume of the shipment and a condition that location information of the shipment overlaps or the closest orders are sorted to be close to each other and formed into the same group.

Figure 9:
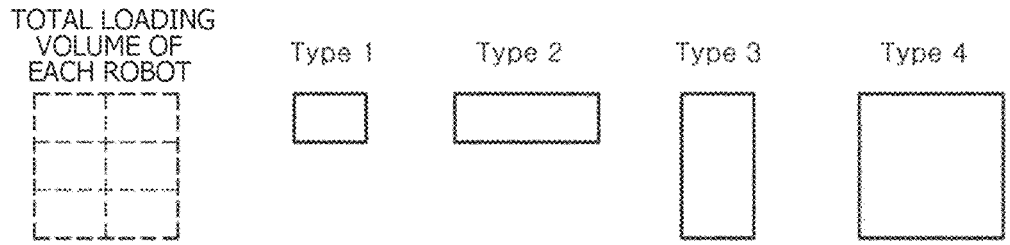
FIG. 9 is a diagram illustrating an example of an operation in which a server according to an embodiment of the present disclosure sorts and groups a plurality of orders according to the volume and storage location of a shipment in a situation where different types of loading boxes may be loaded on a single robot according to an embodiment of the present disclosure.

In this regard, referring to FIG. 9, in addition to being sorted according to the possibility of coexistence as in FIG. 8, an updated list 912 that is sorted by additionally applying whether the picking stations overlap each other may be obtained.

That is, the order planning module 140 may primarily perform sorting according to the possibility of coexistence according to the loading type of each order, and secondarily perform sorting according to the overlap or proximity of the location information of the shipment included in each order.

As a result, referring to the list 912 of FIG. 9, it can be confirmed that the sequence of order 4 and order 6 has been changed, unlike the list 812 of FIG. 8. In this way, the order planning module 140 may obtain one or more groups 921 and 922 as in FIG. 9 by sorting and grouping the plurality of orders according to the possibility of coexistence according to the loading type of each order and the overlap (or proximity) of the location information (picking station) of the shipment included in each order.

In the case where different types of loading boxes can be loaded on one robot, when a plurality of groups are obtained according to at least one of the above-described embodiments (FIG. 8 and FIG. 9), the task allocation module 150 may allocate a plurality of groups to a plurality of robots so that the groups and robots are matched one-to-one.

At this time, the group may be allocated only to the robot that is waiting without a separate allocated task, or the group of orders to be performed next may be allocated in advance to at least one robot that is currently performing at least one task (e.g., a picking task, an unloading task, etc.). However, the group of the orders may be allocated preferentially to the robot that is waiting.

In one embodiment, the order planning module 140 may allocate a plurality of groups to a plurality of robots based on the location of the picking station matching at least one shipment included in the orders constituting each group and the current location of each of the plurality of robots.

Specifically, the task allocation module 150 may compare the location of the picking station matching the location where each of the shipments included in the orders constituting each group is stored with the current location of each of the plurality of robots.

For example, the average value for the locations of the picking stations matching the shipments included in each order may be compared with the current location of each robot, or the location of the picking station closest to each robot among the picking stations matching the shipments included in each order may be compared with the current location of each robot.

Here, the task allocation module 150 may minimize the movement path of the robot by allocating each group to the robot with the smallest difference according to the above-described comparison.

In the process of allocating the group of the orders to each robot, the order planning module 140 may allocate the group of the orders with the loading boxes, and the task allocation module 150 may associate the loading box associated with the group of the orders with the robot, while the group of the orders may be allocated to the robot after the robot and the loading box are associated with each other first. The association between the robot and the loading box may be made when the unique number or code of the loading box is recognized through at least one of a scanner, camera, and a user input unit (e.g. keypad or touch screen) equipped on the robot. In addition, the association between the robot and the loading box may be replaced by the server 100 associating the robot and the loading box without external recognition or input, or controlling the output device (e.g. display, speaker, etc.) of the robot or the user terminal of the worker to output the associated content. The process of allocating individual orders within the group to each loading box may be performed before the loading box is loaded onto the robot (after the group of orders is allocated to the robot), or after the loading box is loaded. One order may be allocated to one loading box, but it is also possible for one order to be allocated to the plurality of loading boxes.

Figure 10:
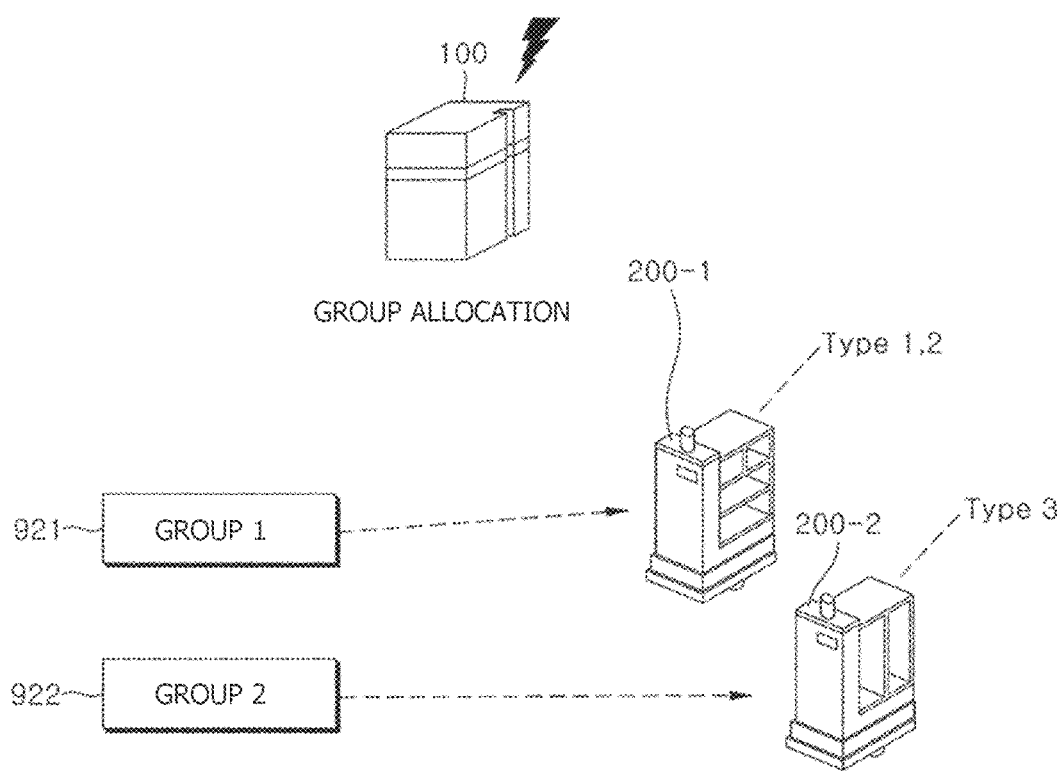
FIG. 10 is an exemplary diagram illustrating an operation in which a server according to an embodiment of the present disclosure allocates each group to one robot.

In this regard, FIG. 10 is a diagram illustrating an example of an operation of a server according to an embodiment of the present disclosure for allocating each group to one robot in a situation in which different types of loading boxes can be loaded on one robot according to an embodiment of the present disclosure.

The order planning module 140 may transmit information on the loading type matching each of the orders included in each of the groups to one of the robots or to the terminal of the worker performing the loading of the loading box for each robot.

In addition, the order planning module 140 may generate information on arrangement of the loading boxes in the robot according to the loading type of each of the orders included in each group and transmit the generated information to the terminal of each robot or worker.

For example, it is assumed that a group 921 of FIG. 9 is allocated to a robot 200-1 and a group 922 is allocated to a robot 200-2.

At this time, the order planning module 140 may generate the arrangement information of the loading boxes (e.g., two loading boxes of type 2 are arranged at the bottom and middle of the robot, and two loading boxes of type 1 are arranged at the top of the robot) to be loaded on the robot (200-1) according to the type of each loading box (e.g., type 1, type 2, type 2, type 1) matching each order included in the group 921, and transmit the generated arrangement information to the robot 200-1 or the worker's terminal.

As a result, the loading boxes that are suitable for each loading type of the orders included in the group allocated to each robot can be loaded onto each robot. For example, two loading boxes of type 2 and two loading boxes of type 1 may be loaded onto the robot 200-1 according to the arrangement information, and two loading boxes of type 3 may be loaded onto the robot 200-2.

When each group (order group) is allocated to each robot according to at least one of the various embodiments described through the above-described FIGS. 4 to 10, the task allocation module 150 may allocate tasks to each robot based on the orders included in each group (see S340 of FIG. 3).

Specifically, each robot may identify whether the loading of the loading box for the robot is completed based on a user input (e.g., worker) for the robot or sensing data of a weight sensor, and the task allocation module 150 that has received information notifying the completion of loading from the robot may sequentially allocate tasks (picking tasks, packing tasks, etc.) matching each order allocated to the robot.

At this time, the task allocation module 150 may allocate the picking task for each shipment according to the location of the shipment included in each order.

Specifically, the task allocation module 150 may set the picking order of each shipment according to the location information of each shipment included in the entire orders constituting the group allocated to each robot. At this time, regardless of the order classification, individual picking tasks may be allocated and the picking order may be set according to the location information where each shipment is stored.

Figure 11:
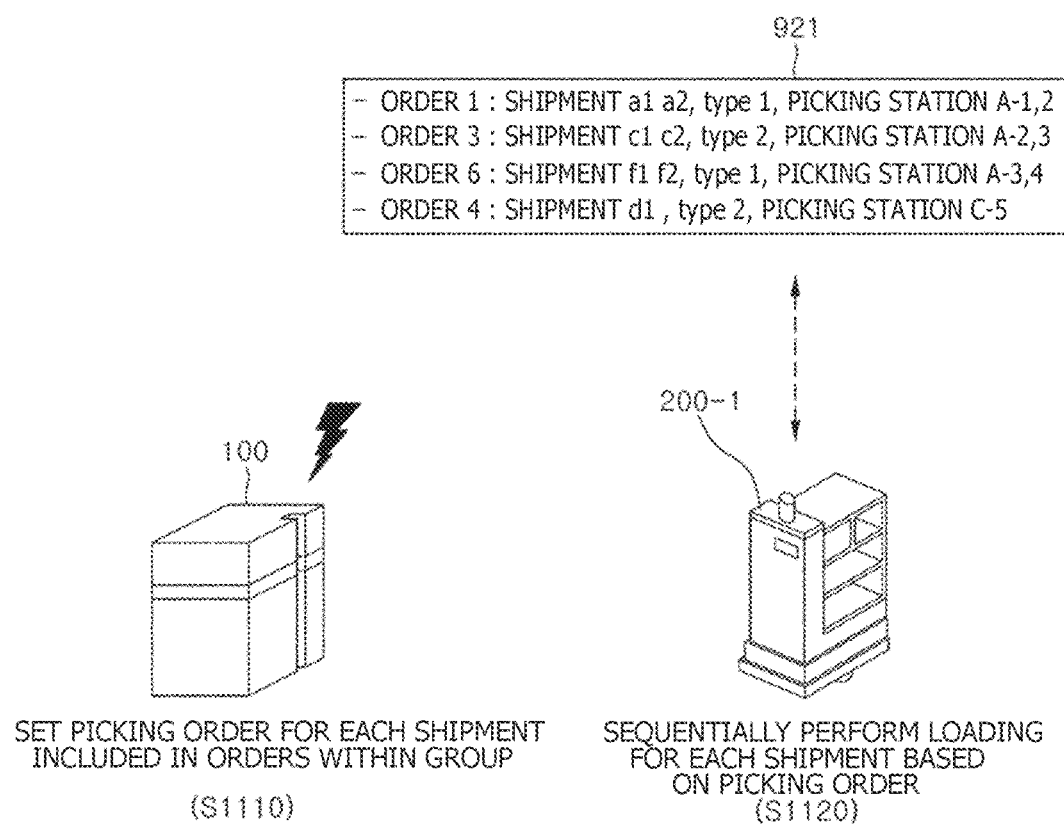
FIG. 11 is an exemplary diagram illustrating an operation in which a server according to an embodiment of the present disclosure sets a picking order for orders within a group allocated to a robot.

In this regard, referring to FIG. 11, in operation S1110, the task allocation module 150 may set the picking order for each shipment included in the orders within the group allocated to the robot 200-1.

FIG. 11 assumes that the group 921 of FIG. 9 is allocated to the robot 200-1.

Specifically, a group including all of a shipment a1 corresponding to picking station A-1, a shipment a2 corresponding to picking station A-2, a shipment c1 corresponding to picking station A-2, a shipment c2 corresponding to picking station A-3, a shipment f1 corresponding to picking station A-3, a shipment f2 corresponding to picking station A-4, and a shipment d1 corresponding to picking station C-5 is allocated to the robot 200-1.

In this case, the task allocation module 150 may set the picking order that minimizes the movement path of the robot 200-1 based on the location of the picking station that matches a location where each shipment is stored. At this time, the task allocation module 150 may set the picking order based on the current location of the robot 200-1.

For example, it is assumed that the current location of the robot 200-1 is closest to the picking station C-5, and C-5 is closest to A-1 among A-1, A-2, A-3, and A-4. In this case, the task allocation module 150 may set the movement order of the robot 200-1 in the order of C-5, A-1, A-2, A-3, and A-4 so that the movement path of the robot 200-1 is minimized, and sequentially allocate the picking task for the shipment matching each picking station to the robot 200-1 according to the movement order of the picking stations set in this way.

At this time, the task allocation module 150 may control the robot 200-1 to sequentially move to the picking station matching the location where each shipment is stored according to the set picking order and sequentially perform loading for each shipment.

Specifically, the task allocation module 150 may identify the picking station matching the location where the shipment included in the order is stored as the destination of the robot through the destination management module 130. The robot may move to the picking station corresponding to the destination. In this case, the movement path for moving to the picking station which is the destination may be generated through the task allocation module 150 or a separate server/system that performs robot control.

As a result, in operation S1120, the robot 200-1 may sequentially perform loading for each shipment while moving to the picking station matching each shipment based on the picking order.

In addition, as an example, the task allocation module 150 may set the picking order so that the worker's movement path for loading the shipment onto the robot is minimized.

To this end, in the process of setting the picking order for the group allocated to each of the plurality of robots, the task allocation module 150 may perform a simulation to calculate the expected arrival time of each robot at the picking station for the current location of each robot and various picking orders that may be set for each robot. In this case, the moving speed of each robot, the movement path of each robot according to the picking order, the time required for loading a unit quantity of shipments (e.g., the time may be preset), etc., can be utilized. At this time, based on the expected arrival time of one or more robots arriving at each picking station, the task allocation module 150 may set the picking order for each of the plurality of robots so that the movement path of the worker in charge of loading (loading shipments) for the adjacent multiple picking stations is minimized within a certain time.

In addition, in one embodiment, the task allocation module 150 may set the picking order of each robot under the condition that the density per unit area does not exceed a certain value during the movement process of a plurality of robots that sequentially perform the picking task.

For example, in a case where the picking order of each robot is set primarily so that the movement path of each robot is minimized, assuming that each robot performs picking according to the primarily set picking order, the location of the robot may be predicted for each unit of time. According to the prediction result, when it is predicted that the density of robots in at least one unit area (for at least one unit time) exceeds a certain value, the task allocation module 150 may change and set the picking order of at least one robot so that the density does not exceed a certain value.

When the picking order is set for each robot according to at least one of the above-described embodiments, each robot may move to load the shipment included in each order according to the picking order.

Figure 12A:
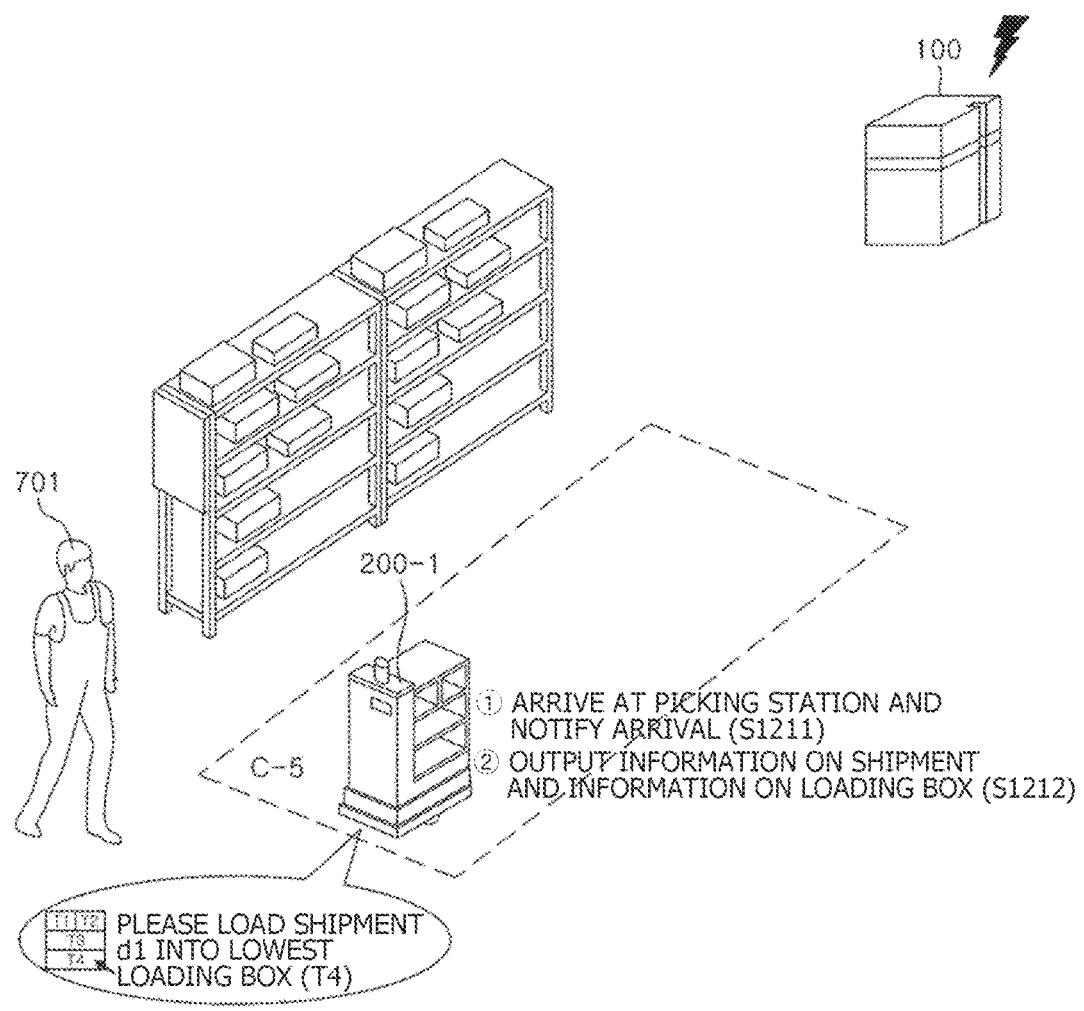
FIG. 12A is a diagram illustrating an operation in which a server according to an embodiment of the present disclosure controls the movement and loading of a robot for a picking station matching a sequential order.

Meanwhile, FIG. 12A is a diagram illustrating an operation in which a server according to one embodiment of the present disclosure controls the movement and loading of a robot to a picking station.

FIG. 12A is based on the assumption that the group 921 is allocated to the robot 200-1 as in FIG. 11, and assumes a situation in which the robot 200-1 moves to the picking station C-5 to pick the shipment d1 corresponding to the first picking order.

Referring to FIG. 12A, the robot 200-1 may arrive at a picking station (e.g., C-5) and output information indicating arrival in operation S1211. At this time, the information indicating arrival may be output visually/audibly through the display and/or speaker of the robot 200-1.

In addition, in operation S1212, the robot 200-1 may output information on a shipment to be loaded and information on a loading box into which the shipment should be loaded. At this time, the robot 200-1 may output each piece of information visually/audibly through the robot's display and/or speaker.

Specifically, the robot 200-1 may output the type, product name, quantity, identification number, storage location, etc., of the shipment to be loaded, and may output at least one of the location, identification number, and color of the loading box into which the shipment should be loaded within the robot.

For example, as shown in FIG. 12A, the robot 200-1 may display the identification number (e.g., T4) of the loading box matching the order including the shipment d1 among the plurality of loading boxes loaded on the robot 200-1, and additionally display a graphic user interface (UI) image (e.g., arrow, guide line, etc.) to guide the location of the corresponding loading box T4. In addition, the robot 200-1 may provide guidance texts guiding the location of the loading box (e.g., the loading box (T4) located at the bottom).

As a result, a worker 701 may take out the shipment from the storage location and load the shipment into the loading box of the robot 200-1. At this time, the worker 701 may recognize code information attached to the shipment through the robot's sensor (e.g., barcode scanner, infrared sensor, camera sensor, etc.), and as a result, the robot 200-1 may confirm the completion of loading of the shipment matching the code information (e.g., barcode, QR code, etc.).

Meanwhile, when the loading is not completed even after a certain period of time has passed since the information on the shipment and the loading box were output, the robot 200-1 may visually and/or audibly output a request or notification urging loading.

Figure 12B:
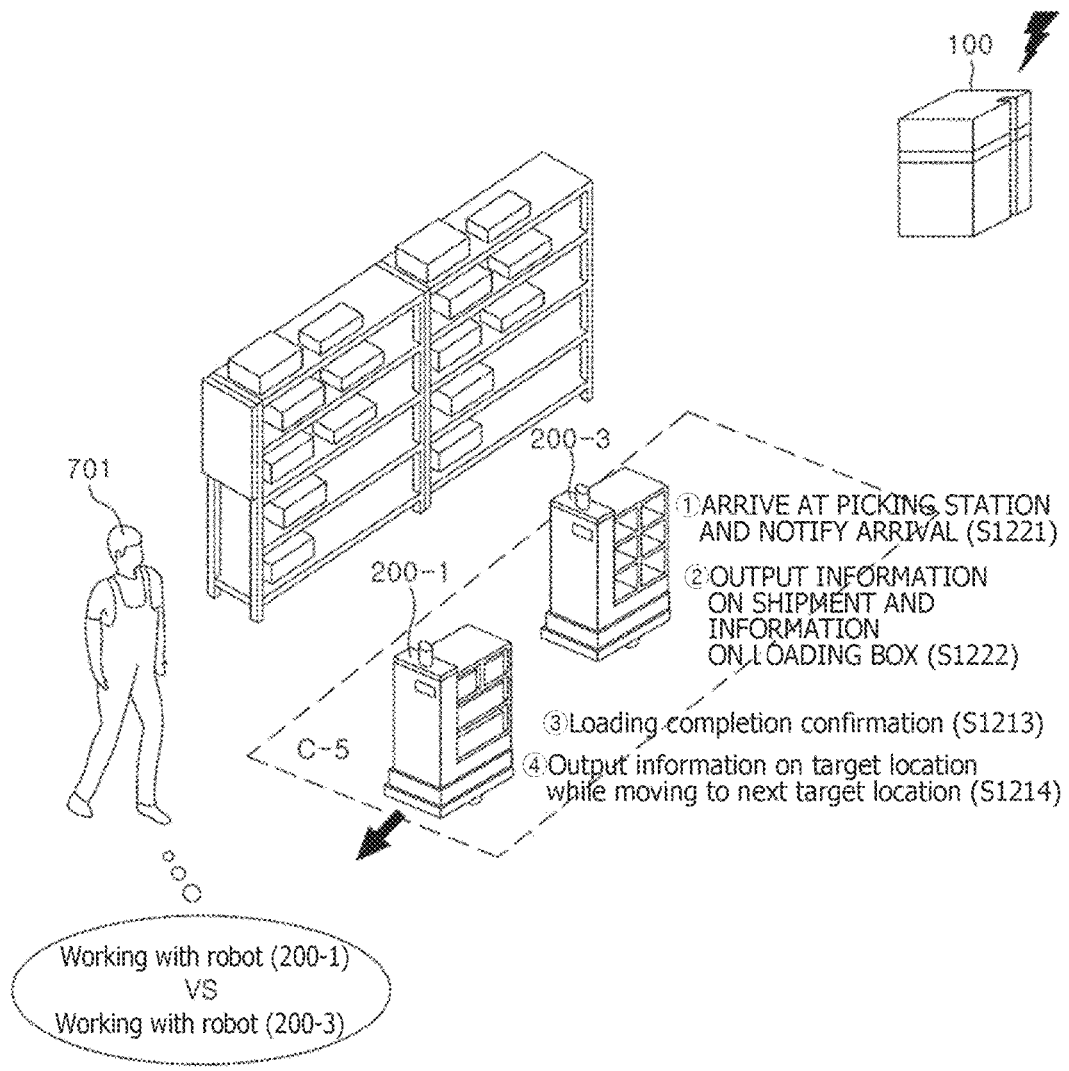
FIG. 12B is a diagram illustrating an operation in which a server according to an embodiment of the present disclosure controls the output of a robot's information on the next target location after loading.

Meanwhile, FIG. 12B is a diagram illustrating an operation of a server according to an embodiment of the present disclosure for controlling a robot's information output for the next target location after loading.

Referring to FIG. 12B, when loading of the shipment of the robot 200-1 is completed with respect to a picking station C-5 in operation S1213, the robot 200-1 may output information on a target location while moving to the next target location in operation S1214.

Specifically, when there are still unloaded shipments remaining in the group allocated to the robot 200-1, the target location may be a picking station for performing loading on the next picking order.

Referring to FIG. 12B, when loading of shipment d1 is completed for picking station C-5 corresponding to a first picking order, the robot 200-1 may start moving to the target location according to the next picking order and output information (e.g., location, identification information) on the picking station related to the storage location of the shipment matching the next picking order.

At this time, the robot 200-1 may output information on the shipment matching the target location together. As a result, the worker 701 may identify the shipment to be loaded next on the robot 200-1 and the picking station.

On the other hand, when the loading of all the shipments included in the group allocated to the robot 200-1 is completed, the target location may correspond to at least one packing station for unloading the shipments. In this case, the robot 200-1 may output information (e.g., location, identification information) on the packing station for unloading.

Meanwhile, referring to FIG. 12B, in addition to the robot 200-1, another robot 200-3 may also arrive at the picking station (e.g., C-5) to load at least one shipment within the group allocated to the robot 200-3. Similarly to the robot 200-1 of FIG. 12A, the robot 200-3 may also notify the robot's arrival at the picking station in operation S1221 and output information on the shipments and the loading box in operation S1222.

At this time, the worker 701 may perform tasks by determining whether to perform loading for the shipment related to the next picking order of the robot 200-1 while following the robot 200-1 or whether to perform loading for the order of the newly arrived robot 200-3.

In this way, the server 100 according to the present disclosure may output the information on the shipment that should be loaded when each robot arrives at the picking station, and also output the information on the next target location to move to and the next shipment to be loaded after loading is completed, thereby supporting active selection of the worker 701 for work efficiency depending on the situation.

When the loading of all orders included in the group allocated according to at least one of the above-described embodiments is completed, the server 100 may allocate the packing task to each robot, and each robot may move to the packing station for unloading.

When each robot arrives at the packing station for unloading, similarly, each robot may output an arrival notification, and output information on the currently loaded shipment and information on the loading box in which each shipment is loaded.

The server 100 may identify whether the unloading of the shipment for each robot is completed based on a user input received through each robot. For example, the user input for selecting "unloading completed" for each robot may be received in the form of a touch or button input.

Alternatively, the server 100 may identify "unloading completed" by recognizing the code information of each shipment loaded on the robot through the sensor of the worker terminal of a worker placed at an unloading location.

The worker allocated to the unloading station may perform unloading or packing of the shipment. The worker terminal of the unloading station may correspond to an inspection PDA, a barcode reader, etc., but is not limited thereto.

The code information of each shipment recognized through the worker terminal of the unloading station may be transmitted to the WMS 10. As a result, the WMS 10 may identify whether packing of the shipment matching each order has been performed.

In this way, the robot identified as "unloading completed" may be switched to a standby state, and the server 100 may allocate a group containing remaining orders that have not yet been allocated, to the robot within a number currently being in progress. The robot and the loading box may be designed so that, during the unloading process, only the shipments in the loading box are taken out, or the loading box containing the shipments are all taken out.

When the number that was in progress is completed, the server 100 may move the robot to the standby station. The standby station is a place for the robot to stand by and include at least one charging device for supplying power to the robot when the robot is automatically charged. In addition, the standby station may be used as a setting station where the loading box may be loaded as described above.

Alternatively, the server 100 may allocate the group of orders to each robot in the standby by performing the same operation as in FIG. 3 again with respect to the orders in the newly activated number.

Meanwhile, the various embodiments described above may be implemented by combining two or more of the embodiments as long as the various embodiments are not incompatible with each other.

Meanwhile, the various embodiments described above may be implemented in a recording medium that can be read by a computer or a similar device using software, hardware, or a combination thereof.

In terms of hardware implementation, the embodiments described in the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electrical units for performing functions.

In some cases, the embodiments described herein may be implemented in the processor itself. In a software implementation, the embodiments, such as the procedures and functions described herein, may be implemented in separate software modules. Each of the software modules described above may perform one or more of the functions and operations described herein.

Meanwhile, computer instructions or computer programs for performing processing operations in electronic devices such as robots and servers according to various embodiments of the present disclosure described above may be stored in a non-transitory computer-readable medium. When the computer instructions or computer programs stored in the non-transitory computer-readable medium are executed by a processor of a specific device, they cause the specific device to perform processing operations in a server according to various embodiments described above.

A non-transitory computer-readable medium is not a medium that stores data for a short period of time, such as a register, cache, or memory, but a medium that stores data semi-permanently and can be read by a device. Specific examples of non-transitory computer-readable media may include a CD, DVD, hard disk, Blu-ray disk, USB, memory card, ROM, etc.

Although exemplary embodiments of the present disclosure have been illustrated and described above, the present disclosure is not limited to the specific embodiments described above, and various modifications may be made by a person skilled in the art pertaining to the present disclosure without departing from the gist of the present disclosure claimed in the claims, and such modifications should not be individually understood from the technical idea or prospect of the present disclosure.

The invention claimed is:

1. A method of operating a server, comprising:
   sorting, by the server, a plurality of orders based on at least one of a type of a shipment included in each of the plurality of orders, a volume of the shipment, a storage location of the shipment, and a location of a picking station for loading the shipment;
   acquiring, by the server, a plurality of groups including a plurality of consecutive orders among the plurality of sorted orders;
   allocating, by the server, the plurality of groups to a plurality of robots such that the groups and robots are matched one-to-one; and
   allocating, by the server, tasks to the plurality of robots based on the orders included in each group,
   wherein the allocating of the tasks to the plurality of robots includes setting a picking order of each shipment included in all of the orders constituting one group allocated to a first robot,
   wherein the allocating of the tasks to the plurality of robots includes:
   identifying a loading type of loading boxes of each order constituting a group allocated to the first robot; and
   controlling the first robot to move to a setting station to load a loading box according to the loading type.

2. The method of claim 1, wherein the sorting of the plurality of orders includes setting a sorting order of the plurality of orders according to the volume of the shipment included in each of the plurality of orders.

3. The method of claim 1, wherein the sorting of the plurality of orders includes setting a sorting order of the plurality of orders according to information on a location where the shipment included in each of the plurality of orders is stored.

4. The method of claim 3, wherein the sorting of the plurality of orders includes sorting orders that commonly include shipments stored in at least one location matching the same picking station, close to each other, based on a picking station matching the location where each shipment included in each of the plurality of orders is stored.

5. The method of claim 1, wherein the acquiring of the plurality of groups includes determining, in consecutive first and second orders among the plurality of sorted orders, whether the first order and the second order are included in the same group according to a distance between a first location where at least one shipment included in the first order is stored and a second location where at least one shipment included in the second order is stored.

6. The method of claim 1, wherein:
   the sorting of the plurality of orders includes selecting, for each of the plurality of orders, a loading type of loading boxes matching the volume of the shipment included in each order among a plurality of loading types for a number of loading boxes loaded on a single robot, and sorting the plurality of orders according to the selected loading type of loading boxes; and
   the acquiring of the plurality of groups includes setting orders matching the same loading type to form one group according to the loading type matching each of the stored plurality of orders.

7. The method of claim 1, wherein the allocating of the tasks to the plurality of robots includes:
   setting a picking order for each shipment according to location information of each of the shipments included in all the orders constituting the group allocated to the first robot; and
   controlling the first robot to sequentially move to a picking station matching the location where each shipment is stored according to the set picking order and sequentially perform loading for each shipment.

8. The method of claim 7, wherein the allocating of the tasks to the plurality of robots includes transmitting information about the tasks matching the orders constituting the group allocated to the first robot to the first robot, and controlling, when loading of all the orders within the group allocated to the first robot is completed, the first robot to move to a second target location corresponding to a picking station for performing loading for the shipment corresponding to the next picking order while outputting information about the first target location.

9. The method of claim 7, wherein the allocating of the tasks to the plurality of robots includes transmitting, to the first robot, task information on the orders constituting the group allocated to the first robot, and controlling, when loading of at least one shipment within the group allocated to the first robot is completed, the first robot to move to a second target location corresponding to a packing station for unloading the shipment while outputting information on the second target location.

10. A method of operating a server, comprising:
- sorting, by the server, a plurality of orders based on a shipment included in each of the plurality of orders;
- acquiring, by the server, a plurality of groups including a plurality of consecutive orders among the plurality of sorted orders;
- allocating, by the server, the plurality of groups to a plurality of robots such that the groups and robots are matched one-to-one; and
- allocating, by the server, tasks to the plurality of robots based on the orders included in each group, wherein the sorting of the plurality of orders includes:
- selecting a loading type matching a volume of the shipment included in each order among a plurality of loading types for a number of loading boxes loaded on a single robot; and
- sorting the plurality of orders according to the selected loading type, and the acquiring of the plurality of groups includes setting orders matching the same loading type to form one group according to the loading type matching each of the plurality of sorted orders wherein the allocating of the tasks to the plurality of robots includes:
- identifying a loading type of loading boxes of each order constituting a group allocated to a first robot; and
- controlling the first robot to move to a setting station to load a loading box according to the loading type.

* * * * *